United States Patent
Hancock et al.

(10) Patent No.: US 8,172,538 B2
(45) Date of Patent: May 8, 2012

(54) METHOD OF MANUFACTURING A WIND TURBINE BLADE SHELL MEMBER WITH A FASTENING MEMBER AND A WIND TURBINE BLADE WITH A FASTENING MEMBER

(75) Inventors: Mark Hancock, Southampton (GB); Anton Bech, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 1075 days.

(21) Appl. No.: 11/722,933

(22) PCT Filed: Dec. 29, 2004

(86) PCT No.: PCT/GB2004/005433
§ 371 (c)(1),
(2), (4) Date: Dec. 28, 2007

(87) PCT Pub. No.: WO2006/070171
PCT Pub. Date: Jul. 6, 2006

(65) Prior Publication Data
US 2008/0206059 A1    Aug. 28, 2008

(51) Int. Cl.
*F03D 11/00* (2006.01)

(52) U.S. Cl. ............ 416/204 R; 416/229 R; 416/241 A; 416/248; 264/101

(58) Field of Classification Search ............ 264/101, 264/274, 275, 261
See application file for complete search history.

(56) References Cited

U.S. PATENT DOCUMENTS

| | | | |
|---|---|---|---|
| 4,420,354 A | 12/1983 | Gougeon et al. | |
| 4,915,590 A | 4/1990 | Eckland et al. | |
| 6,371,730 B1 * | 4/2002 | Wobben | 416/244 R |
| 7,163,378 B2 * | 1/2007 | Kildegaard | 416/230 |
| 7,780,417 B2 * | 8/2010 | Kirchner et al. | 416/207 |
| 2004/0253114 A1 | 12/2004 | Gunneskov et al. | |

FOREIGN PATENT DOCUMENTS

WO   WO-03/082551   10/2003

* cited by examiner

*Primary Examiner* — Ninh H Nguyen
(74) *Attorney, Agent, or Firm* — Wood, Herron & Evans, L.L.P.

(57) ABSTRACT

A method of manufacturing a wind turbine blade shell member (2) having an incorporated fastening member (4) near the root is provided. According to the method, a fastening member 4 is positioned in a mold (14) with pre-fabricated sticks (8, 10) surrounding a substantial longitudinal part of the fastening member (4) prior to resin infusion. Furthermore, a wind turbine blade comprising a wind turbine blade shell member (2) with a fastening member (4) is provided. Finally, a guiding means for aligning a fastening member (4) relative to a further fastening member and/or relative to the mold during molding and a subassembly comprising a guiding means is provided.

61 Claims, 6 Drawing Sheets

METHOD OF MANUFACTURING A WIND TURBINE BLADE SHELL MEMBER WITH A FASTENING MEMBER AND A WIND TURBINE BLADE WITH A FASTENING MEMBER

TECHNICAL FIELD OF THE INVENTION

The invention relates to a wind turbine blade. More particularly, the invention relates to a method of manufacturing a wind turbine blade shell member with a fastening member for connecting a wind turbine blade comprising the wind turbine blade shell member to a wind turbine hub and a wind turbine blade with a fastening member. Furthermore, the invention relates to a wind turbine blade shell member and a wind turbine blade with an embedded fastening member.

BACKGROUND OF THE INVENTION

Wind turbines are used for converting the power of wind to a source of energy, typically electrical energy. In recent years, the use of yet larger wind turbines has increased the requirements of the connection between the wind turbine blades and the flange of the wind turbine hub. A critical feature is the connection between the fastening members for securing the blade to the hub, which fastening members are provided at the blade root of the blade and the rest of the blade as this connection is subjected to large and cyclic loads during operation.

A durable and yet affordable wind turbine blade manufactured by combining pre-fabricated sticks by vacuum-assisted resin infusion is disclosed in WO 03/008800.

In U.S. Pat. No. 4,915,590 a number of techniques for connecting a wind turbine blade to a hub is described. Particularly the prior art technique described in relation to FIG. 3 of U.S. Pat. No. 4,915,590 is relevant in relation to the present invention. There, steel attachment stud rods are embedded in a wind turbine root by drilling a hole into the end of the wall of the completed wind turbine blade and fixing the attachment stud rods in the hole by adhesive. Drilling of holes into the laminated composite structure is very time-consuming, laminate material is wasted and the wear of the drill is considerable. Furthermore, removal of debris from the hole as well as preventing presence of air in the adhesive is complicated due to the length to width ratio of the hole. A considerable space between the attachment stud rod and the walls of the hole is therefore required leading to a large consumption of adhesive, a relatively weak connection and an unduly large blade wall thickness.

It has been considered to provide the fastening members prior to curing of the blade. WO 03/082551 discloses a blade connection wherein an insert is inserted into a non-cured laminate structure. The insert is provided with a plurality of elevations and recesses of similar longitudinal size and smaller pieces of parallel laminate layers are provided in the recesses. It is necessary to sew the laminate layers together near the insert to provide sufficient de-lamination strength between the smaller pieces of parallel laminate layers and larger outer laminate layers. Sewing of layers is a very time-consuming and complex process and must either take place from the inner side of the hole or from the outer side during lay-up of the laminate layers. Sewing may also interact with the alignment of fibres leading to a decrease in strength of the laminated structure at the most critical place, namely near the inserts.

There is hence a need for a fast and secure method for providing a fastening member in a wind turbine blade.

OBJECTS OF THE INVENTION

It is the object of the invention to provide a method whereby a fastening member is more efficiently provided in the wind turbine blade.

It is another object of the invention to provide a wind turbine blade shell member and a wind turbine blade with an improved connection between the fastening member and the blade.

DISCLOSURE OF THE INVENTION

One or more of the above objects of the invention are realised for a wind turbine blade shell member comprising pre-fabricated sticks, the wind turbine shell member being manufactured by the method of claim 1 and/or for a the wind turbine blade according to claim 26, which wind turbine blade comprises a wind turbine blade shell member with pre-fabricated sticks.

The method concerns manufacturing a wind turbine blade shell member with a fastening member provided near the root end of the wind turbine blade shell member. When embedded in the blade, the fastening member is suitable for connecting the wind turbine blade comprising the wind turbine blade shell member to a wind turbine hub. The method comprises providing a rigid outer mould, positioning one or more fastening members near the end of the rigid outer mould corresponding to the root end of the wind turbine blade, positioning at least two but typically more layers of pre-fabricated sticks near the end of the rigid outer mould corresponding to the root end of the wind turbine blade. The pre-fabricated sticks should be positioned such that they surround a substantial longitudinal part of the fastening member when the fastening member is positioned in the wind turbine blade shell member. Furthermore, one or more layers of pre-fabricated sticks are positioned in a substantial longitudinal part of the rigid outer mould.

Thereafter, an inner mould typically corresponding to the inner surface of the completed wind turbine blade is provided in vacuum-tight connection with the rigid outer mould and the volume between the outer and the inner moulds is evacuated. A curable resin is infused to secure the fastening member to the enclosing pre-fabricated sticks and at least substantially fill the empty spaces between adjacent sticks, the resin is allowed to cure and the shell member is de-moulded. Optionally, the wind turbine shell member is connected to one or more further shell members or other members prior to or after the de-moulding.

The curing may commence during infusion as long as the viscosity is sufficiently low until the infusion is completed. The moulding method is also known as vacuum-assisted resin transfer moulding, VARTM. Due to the large sizes of wind turbine blades, the application of vacuum is highly advantageous over conventional resin transfer moulding. However, if the disclosed principle of embedding of a fastening member is utilised in applications where the resin needs to travel a substantially shorter distance, then other moulding methods, such as e.g. resin transfer moulding, may be applicable.

Typically at least 70% of the fastening member is surrounded by pre-fabricated sticks but dependent on the actual design of the fastening member the surrounded fraction may vary. If for example the fastening member is provided with an internally threaded bore, as much as near 100% of the fastening member may be surrounded by pre-fabricated sticks. On the other hand, if the fastening member is provided with a long rod for connecting to the hub, which rod extends from the fastening member, then as little as 50% of the fastening member may be surrounded by pre-fabricated sticks. Furthermore, the surface topology and/or the surface chemistry may promote or impede the strength of the connection and hence the required fraction to be embedded.

The wind turbine blade comprises a wind turbine blade shell member with pre-fabricated sticks connected by a cured resin and a plurality of fastening members embedded near a root end of the wind turbine blade. At least two of said fastening members are aligned to facilitate later connection to a wind turbine hub. Having fastening members aligned means that threaded holes therein or rods extending therefrom are aligned substantially in parallel such that they are suitable for the connection of the wind turbine blade to a flange of the hub or another receiving element.

The present invention further relates to preferred embodiments concerning circumstances of methods and products relating to preparation for transfer of lightning to the hub via the fastening members, the surface topology and shape of fastening members, wind turbine blades with high content of structural fibres, guiding means for alignment of fastening members and aspects relating to vacuum-assisted resin transfer moulding.

BRIEF DESCRIPTION OF THE DRAWINGS

The invention will be explained more fully below with reference to exemplary embodiments as well as the drawings, in which.

All the figures are highly schematic and not necessarily to scale, and they show only parts which are necessary in order to elucidate the invention, other parts being omitted or merely suggested.

DESCRIPTION OF THE DRAWINGS

Figure 1:
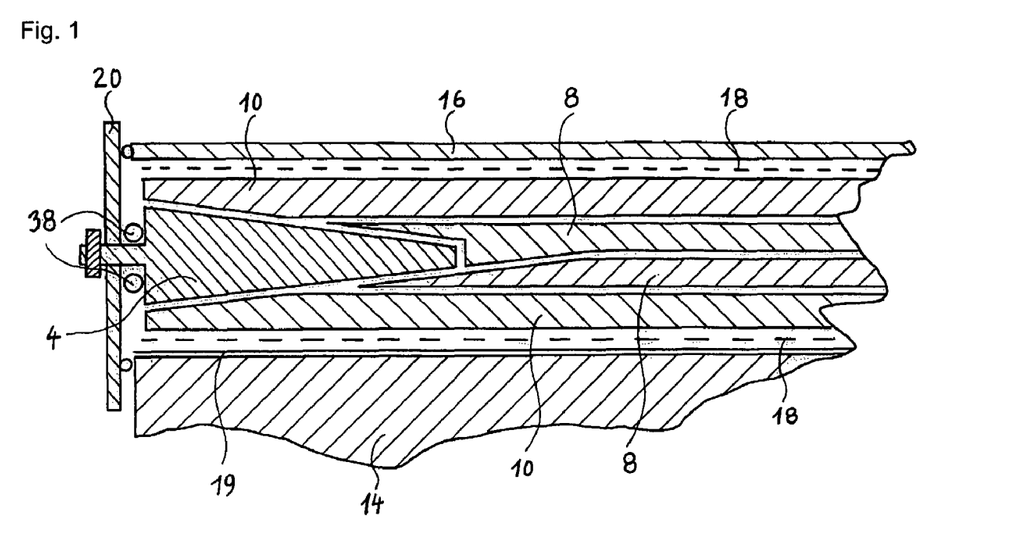
FIG. 1 shows a cross sectional view of a wind turbine blade shell member in a mould

In FIG. 1, an example of a wind turbine blade shell member 2 in a mould 14, 16 is shown. A plurality of layers of pre-fabricated sticks 8,10 are positioned to conform to a fastening member 4, which advantageously is connected to a guiding means 20 for alignment (see below). The connection is preferably in a vacuum-tight manner to allow for vacuum assisted resin infusion. Such a vacuum-tight connection may for example be realised with a rubber-like element 38. In FIG. 1, the number of layers of pre-fabricated sticks 8,10 is four, but the number of layers may vary considerably dependent on the size and design of the shell member. Typical values of layers of pre-fabricated sticks are 2, 3, 4, 5, 6, 8, 10 or even more layers. Furthermore, a number of optional layers may be provided, such as an outer and/or inner fibre layer 18, a gel coat 19 and/or a lightning conductor, etc. Finally, an inner mould 16 is provided prior to the resin infusion process.

Pre-Fabricated Sticks

In a highly preferred embodiment of the present invention, a crucial element of the method, the wind turbine blade shell member and the wind turbine blade according to the invention is the pre-fabricated sticks. The pre-fabricated sticks are typically substantially longer in the dimension to be aligned with the length of the shell member than in the other dimensions. The sticks may be chamfered near the end, either to allow for a soft transition to an extending stick or to allow for non-abrupt change in blade properties if the stick is not extended.

In a preferred embodiment, at least some of the pre-fabricated sticks are selected from the group of fibrous members, wooden material and hollow members. Examples of preferred fibrous members are pultruded or extruded members preferably comprising carbon fibres and/or glass fibres and/or natural fibres. The pultruded member may be uncured, partially cured or fully cured, but fully cured members are preferred, e.g. due to ease of handling. Examples of preferred wooden members are machined wood with a high strength to weight ratio, such as balsa, birch, etc. The wooden members may also be plywood, preferably comprising balsa, birch or other wooden material with similar properties. Hollow members include hollow polymer-based members, such as blow-moulded sticks, foam sticks, extruded members, optionally comprising fibrous material.

The combination of sticks should be chosen to provide a suitable compromise between strength, weight and price.

Positioning of Pre-Fabricated Sticks Near Fastening Member

In a preferred embodiment, the pre-fabricated sticks to be positioned adjacent to the fastening member are machined or otherwise shaped such that when the sticks are in position, the sticks conform to the shape of the fastening member. Preferably the sticks will conform to the fastening member such that a substantial part of the fastening member is tightly enclosed by the pre-fabricated sticks. By a substantial part of the fastening member is meant that at least about 70% of the fastening member is enclosed or surrounded by pre-fabricated sticks, however, this number may vary to lower than 50% or to near 100% as discussed elsewhere. The non-enclosed part of the fastening member may be accounted for by either one or more longitudinal parts or transverse parts not being enclosed.

The enclosed part of the fastening member is typically in the range of about 0.4 to 2 m, dependent on the length of the blade and the thickness of the blade wall. In a preferred embodiment it was found that fastening member in the range of about 0.5 to 0.75 m provided a suitable compromise between weight and strength of the connection between the blade and the fastening member.

The diameter of the enclosed part varies as discussed elsewhere. In most cases, a diameter corresponding to the maximum area of the cross section of the enclosed part of the fastening member in the range of about 8 to 20 cm is suitable. However, in a preferred embodiment, a diameter corresponding to the maximum area of the cross section of the enclosed part of the fastening member in the range of about 10 to 15 cm was found to provide a suitable compromise between weight and strength of the fastening member as well as the strength of the connection between the blade and the fastening member.

In a preferred embodiment, the sticks are shaped such that they will conform to the fastening member according to the macro surface roughness as discussed elsewhere. This allows for a very low use of resin or adhesive as well as it allows for a highly controllable transition between the properties of the fastening member and the properties of the blade.

Fibrous Members Extending to Near the Root

For very large wind turbine blades, it may be advantageous that some of the pre-fabricated sticks comprising fibrous material, preferably comprising carbon fibres, extending to near the root end of the wind turbine blade shell member. This may increase the stiffness of the root section of the blade and improve transfer of the load to the fastening member may be realised.

In a particularly preferred embodiment, at least one pre-fabricated stick, which stick comprises fibrous material, is positioned adjacent to the fastening member along a substantial longitudinal part of the fastening member. By adjacent is here meant that the stick comprising fibrous material is the stick closest to the fastening member. By substantial longitudinal part of the fastening member is here meant at least 50% of the embedded length of the fastening member. However, it is preferred that the stick is positioned along most of the fastening member, such as at least 75% and more preferably at least 90% of the embedded length of the fastening member. The part of the embedded length along which the fibrous stick may be positioned depends to some extent on the shape of the fastening member, as the mechanical properties of the fibrous material is degraded if the fibres are arranged in a curved relationship. In a highly preferred embodiment, the pre-fabricated stick comprising fibrous material is a pultruded fibrous stick comprising carbon fibres as such a stick typically has a high fibre content and highly aligned fibres.

In a preferred embodiment, at least two pultruded fibrous members are positioned adjacent to the fastening member and along a substantial longitudinal part of the fastening member. Particularly, it is preferred to have the pultruded fibrous members arranged around the fastening member such that the arrangement is substantially symmetrical with regard to one or more physical property such as e.g. stiffness, E-modulus, alignment or ultimate strength.

For blades having fibrous members extending to near the root it is particularly advantageous to introduce the fastening member prior resin infusion as drilling in the blade shell member comprising such fibrous material leads to very high drilling tool wear and furthermore such drilling is rather time-consuming.

Overall Shape of Fastening Member

The overall shape of the fastening member may vary depending on the actual materials and use conditions of the blade. In general, it is preferred to reduce presence of sharp or pointy edges as this may serve as a crack initiator. Furthermore, holes with a small opening angle should also be avoided, as the infusing resin may not be able to penetrate all the way to the tip of such holes.

Figure 2:
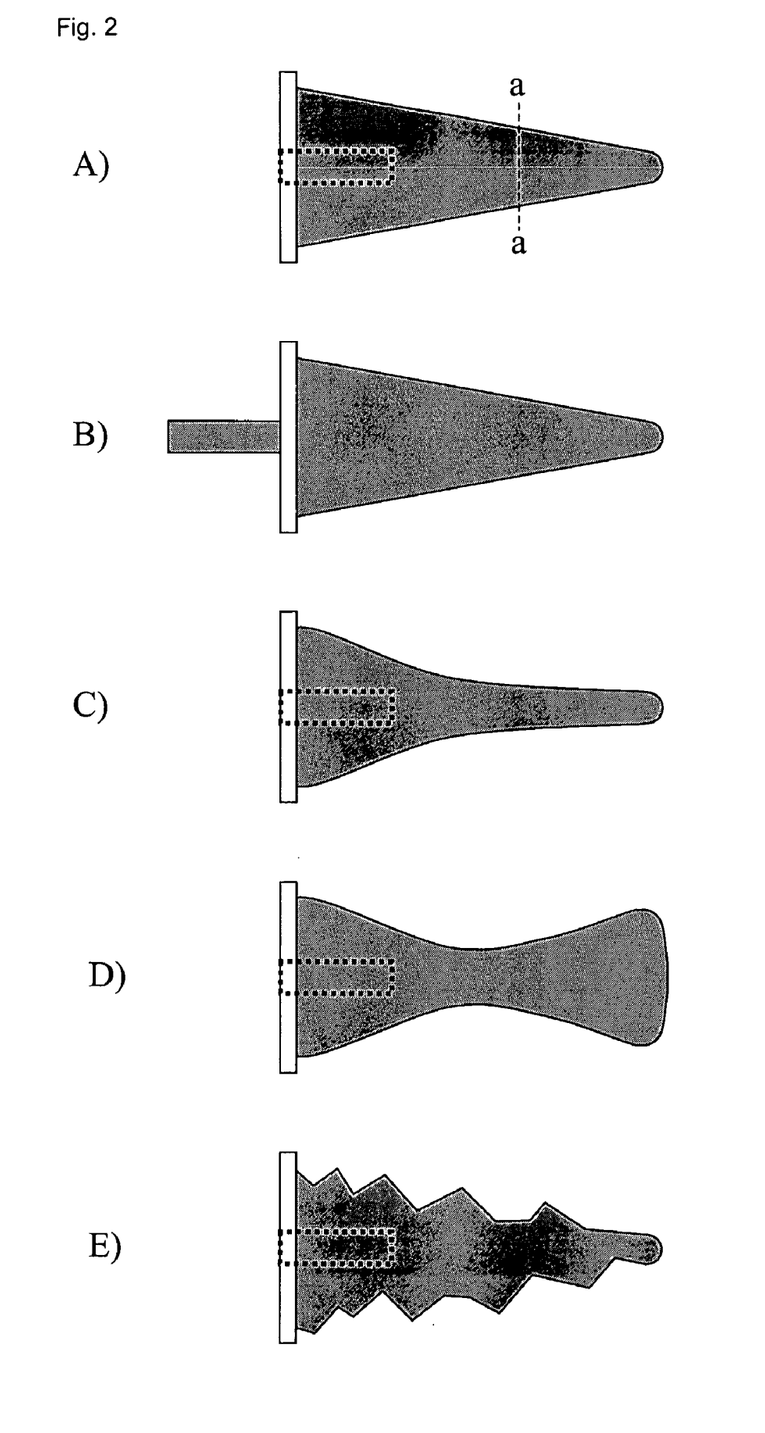
FIG. 2 shows various overall shapes of a fastening member.

In FIG. 2, a number of preferred overall surface shapes of fastening member, which e.g. may be used for the method according to the invention, is shown. Typically, it is preferred that the cross sectional area of the fastening member decreases away from the root of the blade. In such cases, the decrease need not be monotonous or continuous but should represent the overall tendency. This leads to a gradual change in properties from the relatively rigid fastening member to the relatively flexible blade. Examples of such overall shape is the generally conical fastening member shown in FIGS. 2A and B, but the overall shape may also be of a more concave nature, e.g. as shown in FIG. 2C.

If e.g. the blade wall is relatively thick, an overall generally dumb bell (as shown in FIG. 2D) or another anchoring shape may be suitable. Another embodiment with a large size of the end of the fastening member facing away from the root end of the blade is a generally conical fastening member with the wider part facing away from the root end (not shown). These may be advantageous as they provide for a solid mechanical bonding and preserve fastening member material as compared to solid cylindrical fastening member.

Cross Sectional Shape of Fastening Member

Figure 3:
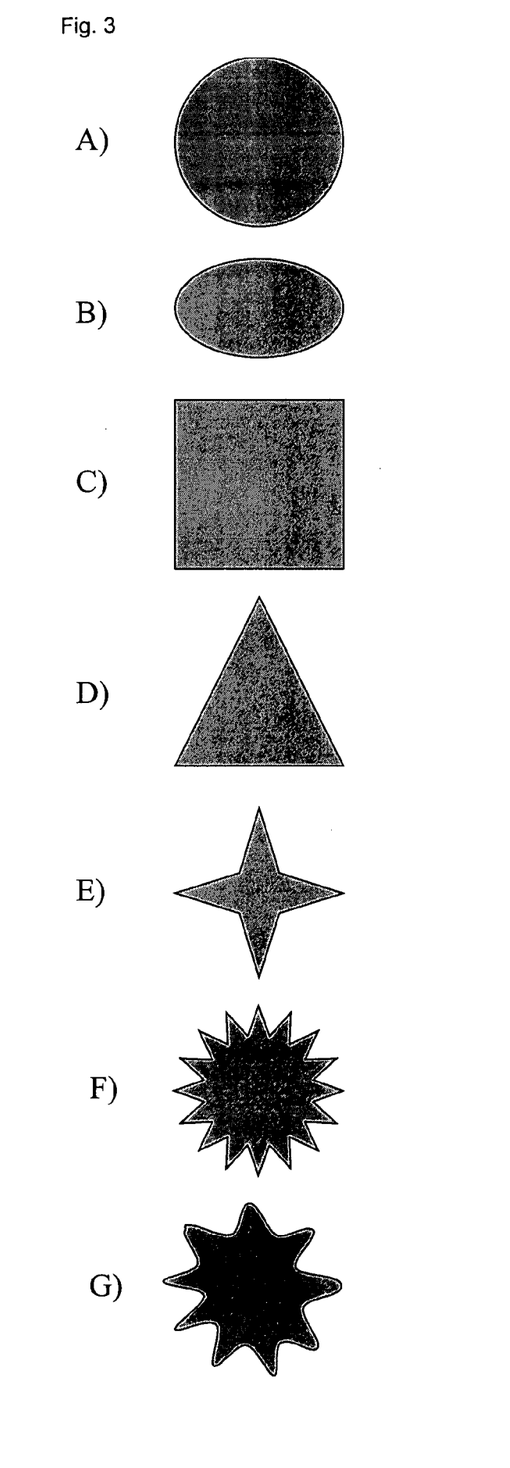
FIG. 3 shows preferred cross sections of a fastening member.

The fastening member shown in FIG. 2E represents the principle that the fastening member need not be rotational symmetrical even though rotation-symmetrical fastening member are typically preferred due to easier handling of a rotation-symmetrical fastening member. Fastening members which are not rotation-symmetrical, have a larger surface area per volume-fastening member. Hence, a larger surface is involved in the load transfer from the blade via the resin or adhesive to the fastening member and on to the hub. In FIG. 3, a number of preferred embodiments of cross sectional shapes of fastening members are shown. The cross sections may for example correspond to a cross section along the plane a-a on FIG. 2A or a similar cross section on any one of the other fastening member on FIG. 2.

The circular cross section in FIG. 3A corresponds to a rotation-symmetrical fastening member. The oval cross section shown in FIG. 3B may e.g. be advantageous for relatively thin blade shells if oriented with the major axis generally parallel to the outer surface of the blade shell. However, if a large number of closely spaced fastening members are needed, use of fastening members with an oval section with major axes substantially parallel to the surface may be advantageous. In FIG. 3C to F examples of geometrically regular cross sections are shown, however, the skilled person would realise that irregular or generally regular cross sections may also be applied. The exemplifying shapes are provided to describe the overall idea, whereas for example the sharpness of the edges should be adjusted according to the load pattern and the used resin in the specific application. An example of a cross section having rounded edges are shown in FIG. 3G. Fastening members, which are not rotation-symmetrical, may also be particularly advantageous under special loading patterns and/or for off-centred fastening member.

Surface of Fastening Member

The surface of the fastening members is preferably modified or designed to strengthen the connection between the resin and the fastening member whereby the overall quality of the connection between the blade and the fastening member is increased. The surface may be prepared for increased mechanical strength and/or chemical strength.

Figure 4:
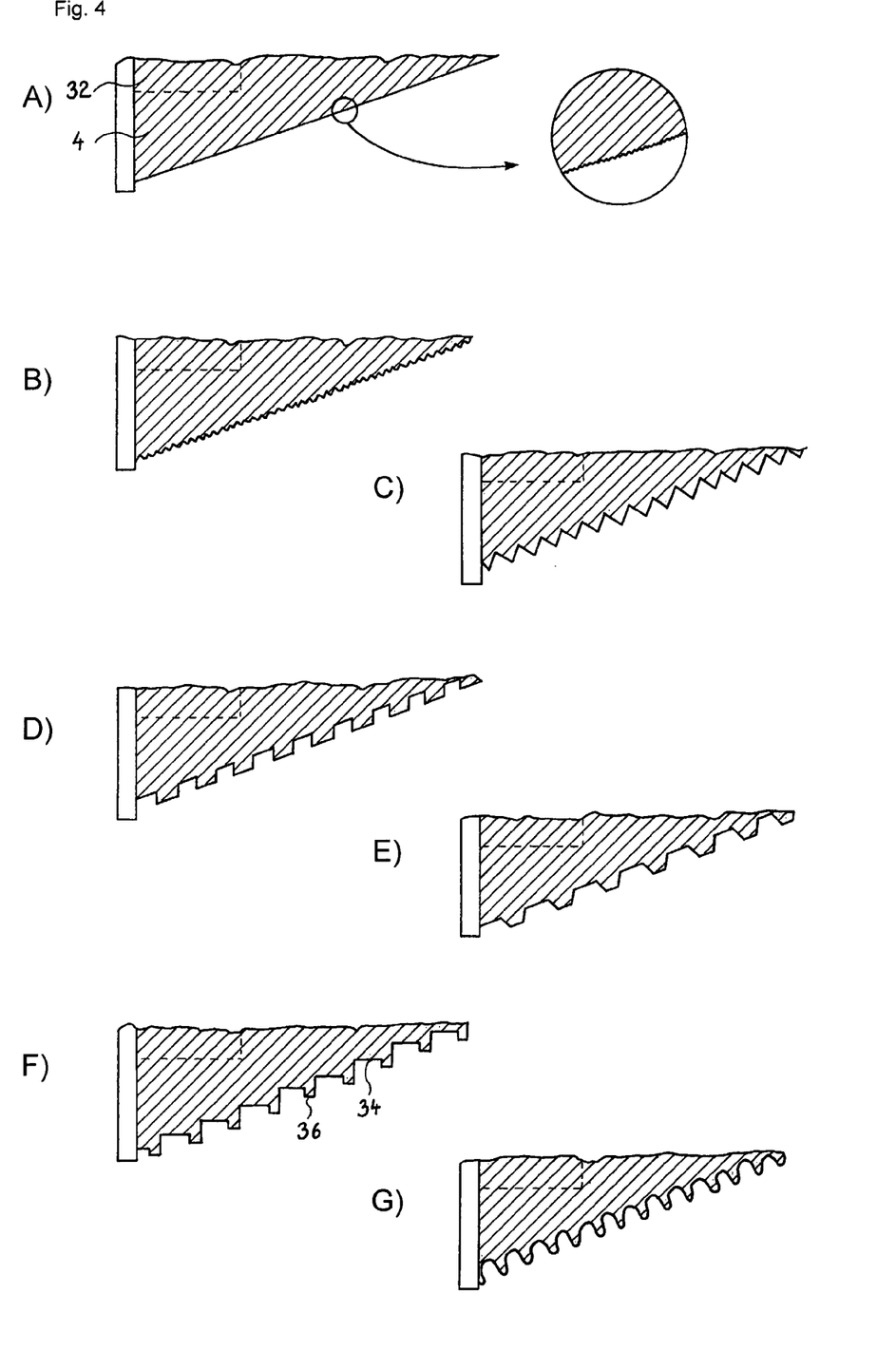
FIG. 4 shows preferred surface topographies of a fastening member.

An example of mechanical strengthening is interlocking structures, which may be used on several dimensional scales. In a preferred embodiment, the surface roughness of the fastening member is increased on a micrometer to sub-millimeter scale as indicated in FIG. 4A. This may be achieved during manufacturing of the fastening member, e.g. by the use of a rough surface in the mould, or by subsequent surface treatment like e.g. sand blasting or grinding. Alternatively or in addition, the surface roughness may be increased on a millimeter scale, such as by introducing waves of about 1 to 5 millimeter transverse to the longitudinal length of the fastening member as indicated in FIG. 4B. Furthermore, macro surface roughness, e.g. steps, tips or waves in the order of several millimeters to several centimeters, may interlock with the pre-fabricated strips or resin surrounding the fastening member. Examples of fastening member with macro surface roughness are shown in FIG. 4C to G. Increase in surface roughness may greatly increase the bonding strength and/or decrease the potential problems arising due to variation in properties between the blade and the fastening member.

If interlocking structures are provided as indicated in FIG. 4D to F, the size, i.e. the longitudinal extension along the length of the fastening member, of recesses and protruding structures may be similar as shown in FIG. 4D. However, it is highly preferred that the size is adjusted according to the relative strength of the fastening member and the surrounding material filling the recesses of the fastening member (typically resin). In other words, the protrusions of the relatively strong fastening member (typically steel or cast iron) are relatively short as compared to the recesses to be filled with the relatively weak resin, which are relatively long. In FIG. 4E to G examples of this are shown. In FIG. 4E the recesses/protrusions are stepwise, whereas in FIG. 4F the side walls of the recesses/protrusions are angled, which may be advantageous in that the contact angles are less sharp and hence provides reduced tendency to act as crack initiation spots. FIG. 4G shows a series of larger and shorter rounded elements. This is a preferred embodiment, as this design allows for substantially vertical sidewalls without any sharp edges.

In addition to achieving mechanically interlocking structures, increased surface roughness at all scales increases the surface of the fastening member and hence increases the contact area between the fastening member and the resin or adhesive.

Preparation for increased chemical connection strength includes removing of debris from the surface of the fastening member as well as removing of dust, rust, grease, oil, etc. prior to assembling. This may include mechanical removal as well as chemical removal (i.e. use of water and soap or solvents). Furthermore, the surfaces may be chemically treated, e.g. pickled or primed, prior to assembling and/or resin infusion.

The fastening member is preferably provided with a connecting means for facilitating the connection of a wind turbine blade comprising the wind turbine shell member to the hub. Typically this connecting means comprises a threaded surface, such as a threaded hole from the root end of the blade into the fastening member or a threaded rod extending from the fastening member. In a particularly preferred embodiment, such a threaded surface may be used for connecting the fastening member to a guiding means (see below) during manufacturing of the wind turbine blade shell member, e.g. during lay-up and/or during resin infusion, and/or during assembling of wind turbine blade shell members to form a wind turbine blade.

Guiding Means

During the manufacture of the wind turbine shell member, a guiding means for aligning the fastening member may advantageously be applied. The guiding means may align the fastening member relative to the mould and/or relative to one or more further fastening member. During use, one or more fastening members are connected to the guiding means. The connection may be temporary in the sense that the guiding means is removed from the fastening member after one or more steps of the manufacturing method. Alternatively, the connection between the fastening member and the guiding means may be permanent, i.e. the guiding means is integrated into the wind turbine shell member during manufacturing.

If the fastening member is aligned relative to one or more further fastening members then these fastening members are advantageously also connected to a guiding means and preferably to the same guiding means as the fastening member. This allows for a particularly efficient method design since a large number of fastening members may be aligned and thereafter introduced in the wind turbine shell member in one operation.

Figure 5:
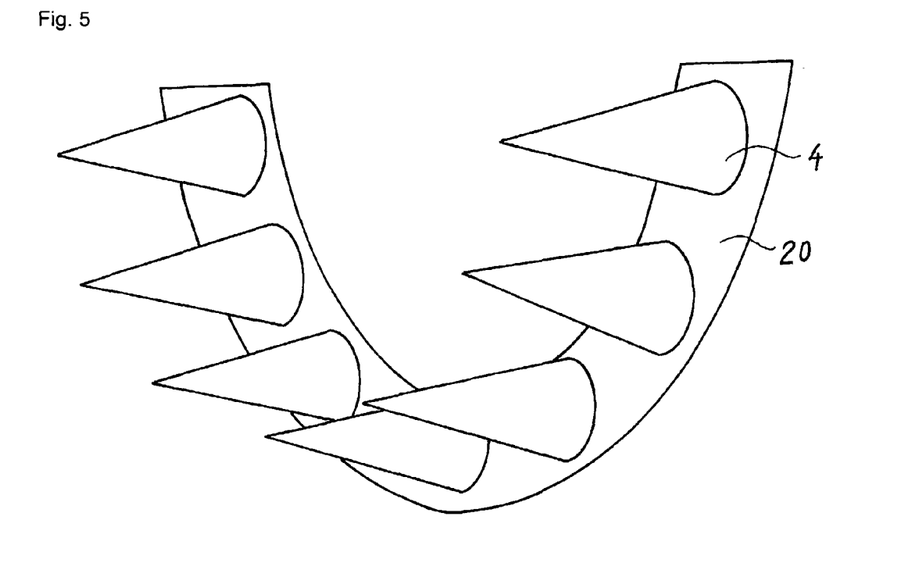
FIG. 5 shows a plurality of fastening members connected to a guiding means.

In FIG. 5, a guiding means with a plurality of fastening member connected thereto is shown. The combination of a guiding means 20 and fastening members 4 is preferably prepared prior to the introduction of the fastening member into the wind turbine shell member and hence in this embodiment constitutes a subassembly for the wind turbine shell member by allowing a simultaneous introduction of a plurality of aligned fastening member into the shell member.

In a preferred embodiment, the subassembly comprises between 15 to 150 fastening members. The guiding means typically holds between ¼ of fastening member to be provided at the root of the completed wind turbine blade and all of the fastening members. Particularly, it is preferred that the guiding means holds all of the fastening members for the shell member to be moulded; typically this corresponds to about ½ of the fastening member to be provided at the root of the completed wind turbine blade.

Figure 6:
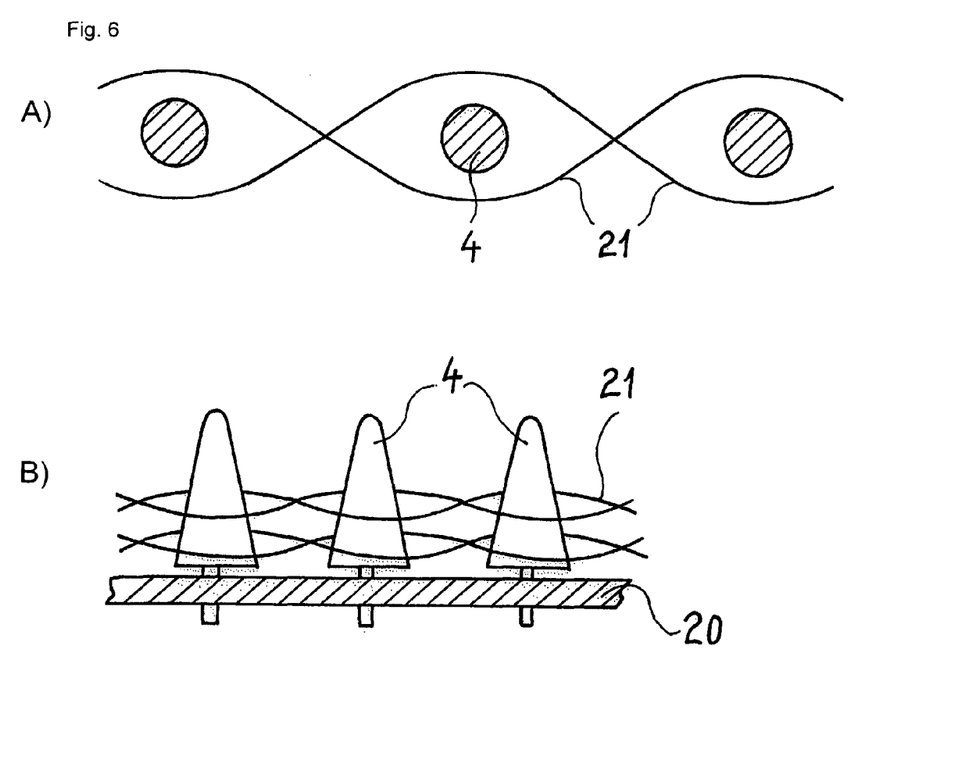
FIG. 6 shows a plurality of fastening members connected to a guiding means with fibres woven about the fastening member.

In unfortunate situations, a fastening member may provide a source for delamination or even cracking of the blade shell. This may particularly be the case if the fastening member is positioned relatively near adjacent fastening members. In a preferred embodiment, preventive measures are provided in that fibre material, preferably glass fibres or carbon fibres, are woven between the fastening member as shown in FIG. 6. FIG. 6A indicates this principle in a direction from the end of the fastening member towards the guiding means and B indicates the principle from the side. The fibres may e.g. be dry or impregnated fibre tows, yarns or other collections of fibres. In a particularly preferred embodiment, fibres are woven mainly or solely about the 25% of the fastening member to be embedded nearest the root of the wind turbine blade shell member. However, in some cases, fibres may be woven along a larger part of the fastening member leading to the combination of fastening members, guiding means and fibres, optionally with small prefabricated sticks positioned at one or more openings in the woven fibre structure. Such a combination forms a semicircular wedge extending from the guiding means and may be introduced into a groove or channel in a wind turbine blade root. Further sticks may thereafter be positioned near the combination prior to resin infusion.

If a temporary connection between the fastening member and the guiding means is utilised, the method of manufacturing may further comprise the step of releasing the temporary connection. Usually, the guiding means should thereafter be removed from the wind turbine blade shell member.

The resin infusion is typically vacuum-assisted and hence the guiding means is advantageously generally gas impermeable. Furthermore, the guiding means should in this case also be arranged to provide a gas tight connection between the guiding means and the rigid mould and/or the inner mould. It is preferred that guiding means provide a gas tight connection between both the rigid mould and the inner mould. The gas tight connection may e.g. be provided by rubber-like elements 38, e.g. a flexible O-ring, between the moulds and the guiding means in combination with a locking mechanism to keep the connection. The locking mechanism may involve vacuum force provided by the vacuum for the resin infusion; a mechanical means, such as a clamp, bolt and nut; a chemical means, such as adhesive; or a combination of 2 or more of these.

In a preferred embodiment, the connection between the fastening member and the guiding means involves engaging of a threaded hole or a threaded rod of the fastening member with a bolt or a nut via a hole in the guiding means. The threaded hole or rod of the fastening member may advantageously also be suitable for connecting a wind turbine blade comprising the wind turbine shell member to a wind turbine hub.

In another preferred embodiment, the connection between the fastening member and the guiding means is generally gas tight. Such a gas tight connection may comprise an O-ring.

The O-ring may advantageously be arranged on the vacuum side of the guiding means, since this may prevent infusing resin from interacting with the elements providing the connection between the fastening member and the guiding means.

The guiding means for aligning a fastening member during resin transfer moulding of a wind turbine blade shell member, comprises in a preferred embodiment a generally gas tight plate-like member, a means for obtaining a temporary or a permanent connection between the gas tight plate-like member and at least one fastening member, and a means for obtaining a temporary or a permanent connection between the generally gas tight plate-like member and the rigid mould. To realise an overall gas tight connection to facilitate vacuum-assisted resin transfer moulding, at least one of the above temporary or permanent connections should be gas tight. However, it is highly preferred that both of the temporary or permanent connections are gas tight.

By generally gas tight is meant that the gas flow through the member is very low. Of course it is preferred that the members are absolutely gas tight, however, the members for manufacturing of wind turbine blades are of a significant size and a low leak of gas may be compensated for by continuous vacuum pumping.

Lightning Conduction

Wind turbines and particularly wind turbine blades are highly prone to lightning strikes. Therefore the blades are typically provided with lightning receptors and one or more lightning conductors. Examples of lightning conductors are lightning conductor cables, typically positioned inside the blade, conducting metal mesh and/or carbon fibres positioned in the blade wall and/or with internal reinforcement members. To conduct the lightning from the blade via the hub to the ground, the lightning conductor is preferably connected to the fastening member such that the lightning is conducted between the blade and the hub via the fastening member.

It is therefore preferred to arrange the lightning conductor in potential equalizing communication with the fastening member. This may be realised by connecting the lightning conductor directly to one or more fastening member, however, this may lead to a poor electrical connection with a resulting large contact resistance and hence a significant risk of heating damage upon lightning strike.

Figure 7:
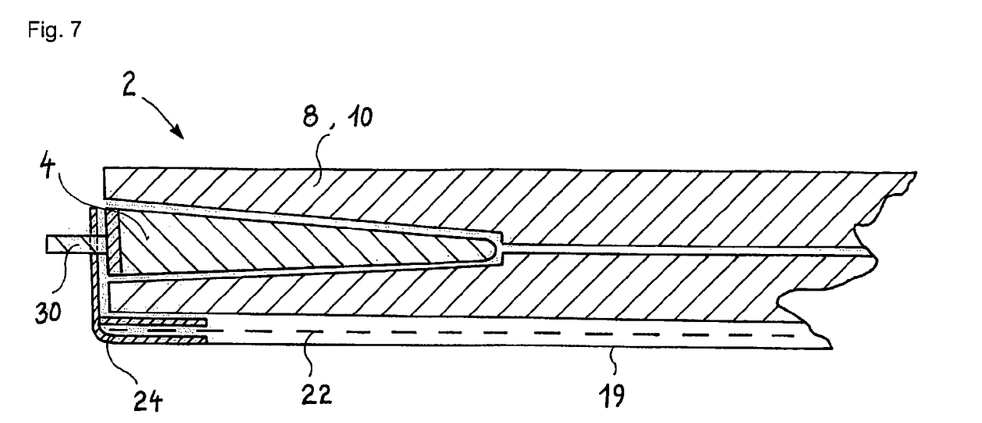
FIG. 7 shows an embodiment with conduction of lightning between a lightning conductor and a fastening member.

It is therefore highly preferred to provide a dedicated lightning transfer means for decreasing the contact resistance between the fastening member and the lightning conductor during operation. The lightning transfer means may e.g. be a conducting flange connecting one or more lightning conductors to one or more fastening members. It is preferred that the lightning transfer means is connected to a plurality of fastening members to increase the efficient lightning conducting cross section of the fastening members. In another embodiment shown in FIG. 7, the lightning transfer means 24 comprises a sheet of conducting material, which is positioned adjacent to the lightning conductor 22. In a preferred embodiment, the lightning transfer means 24 is either sandwiched between several lightning conductors 22 and/or the lightning transfer means 24 is sandwiching the lightning conductor with one or more lightning transfer means 24. This embodiment is particularly suitable for lightning conductors of the metal-mesh-conductor type since a rather large contact area may be achieved in this way. In yet another embodiment, the lightning transfer means comprises carbon fibres, such as a carbon fleece, a carbon fibre web or a carbon fibre mat, which decreases the contact resistance of the connection even when wetted with resin.

It is preferred that the lightning conductor is in communication with the fastening member adjacent to the root end of the wind turbine blade shell member as this decreases the distance that the lightning must travel inside the fastening members and hence decreases the likelihood of heating damage of the fastening members and surrounding material.

Further Elements of Blade and Shell Member

In addition to the already mentioned elements and steps, further elements may optionally but typically preferably be comprised. Examples of such optional elements are applying of surface material such as a gel coat, applying of a lightning conductor, such as a metal mesh and/or a lightning conductor cable, and applying one or more layers comprising fibre material near the inner or the outer surface of the shell element. The fibre material preferably comprises glass fibres and/or carbon fibres. The optional elements may be applied to the mould or to an element in the mould—which is advantageous as a fast procedure and homogeneous product may be realised—or after the moulding.

Manufacturing of a Wind Turbine Blade

Typically, two or more wind turbine blade shell members are used for a wind turbine blade.

A wind turbine blade may be manufactured by securing a wind turbine blade shell member manufacturable by the method according to the present invention to one or more additional turbine blade shell member to form a wind turbine blade. The securing typically involves mechanical fastening means, such as fasteners, e.g. bolts and nuts, screws etc., chemical means, such as adhesive, or a combination. Optionally, further elements, such as a spar or a spacer element may also be provided. It is preferred to use an adhesive identical to or based on similar compounds as the resin used for the (vacuum-assisted) resin transfer moulding.

In another method of utilising the wind turbine blade shell members manufactured according to the invention for preparing a wind turbine blade, a multiplicity of such wind turbine blade shell members are secured together such that the fastening member of two or more of the wind turbine blade shell members are aligned. This alignment many advantageously be realised by aligning the guiding means corresponding to each of the wind turbine shell members. As more than one fastening member typically are connected to each guiding means, a large number of fastening members may rapidly be aligned by this method.

Wind Turbine

According to the invention a wind turbine blade is provided or prepared. Such wind turbine blades are used for wind turbines for energy production, either directly into electrical energy or for an energy storage where the energy is stored as chemical energy or as potential energy.

Features Interchangeable Between Embodiments

An individual feature or combination of features from an embodiment of the invention described herein, as well as obvious variations thereof, are combinable with or exchangeable for features of the other embodiments described herein, unless the person skilled in the art would immediately realise that the resulting embodiment is not physically feasible.

TABLE OF IDENTIFICATION

2 Wind turbine blade shell member
4 Fastening member
6 Root end of wind turbine blade
8 Pre-fabricated sticks
10 Pre-fabricated sticks comprising fibrous material
12 Part of fastening member to be embedded
14 Outer rigid mould 16 Inner mould
18 Fibre layer
19 Gel coat
20 Guiding means
21 Woven fibres
22 Lightning conductor
24 Lightning transfer means
30 Rod extending from fastening member
32 Hole in a fastening member
34 Recess
36 Protrusion
38 Rubber-like element

The invention claimed is:

1. A method of manufacturing a wind turbine blade shell member with a fastening member provided near a root end of the wind turbine blade shell member, the fastening member being suitable for connecting a wind turbine blade comprising said wind turbine blade shell member to a wind turbine hub, the method comprising the steps of:
providing a rigid outer mould;
positioning the fastening member near the end of the rigid outer mould corresponding to the root end of the wind turbine blade;
positioning at least two layers of pre-fabricated sticks near the end of the rigid outer mould corresponding to the root end of the wind turbine blade such that pre-fabricated sticks surround a substantial longitudinal part of the fastening member when the fastening member is positioned in the wind turbine blade shell member;
positioning one or more layers of pre-fabricated sticks in a substantial longitudinal part of the rigid outer mould;
thereafter
providing an inner mould in vacuum-tight connection with the rigid outer mould;
evacuating the volume between the outer and the inner moulds, infusing a curable resin to secure the fastening member to the enclosing pre-fabricated sticks and substantially fill empty space between adjacent sticks, and allowing the resin to cure;
de-moulding the wind turbine blade shell member.

2. The method according to claim 1, wherein the pre-fabricated sticks adjacent to the fastening member are shaped to conform to the shape of the fastening member such that a substantial part of the fastening member is tightly enclosed by the pre-fabricated sticks.

3. The method according to claim 1, wherein the overall shape of the fastening member is generally conical with a larger part pointing into the wind turbine blade shell member.

4. The method according claim 1, wherein the overall shape of the fastening member is concave.

5. The method according to claim 1, wherein the overall shape of the fastening member is generally dumbbell-shaped.

6. The method according to claim 1, wherein the fastening member comprises a part with a non-circular cross section orthogonal to the longitudinal direction of the fastening member.

7. The method according to claim 1, wherein the fastening member is provided with microscopic surface roughness comprising irregularities in the micrometers to millimeter range.

8. The method according to claim 7, wherein the microscopic surface roughness comprises irregularities in the range of 10 µm to 1 mm.

9. The method according to claim 1, wherein the fastening member is provided with macroscopic surface roughness, comprising a plurality of recesses and protrusions in the millimeter to centimeter range.

10. The method according to claim 9, wherein the macroscopic surface roughness comprises a plurality of recesses and protrusions in the range of 1 mm to 5 cm.

11. The method according to claim 1, wherein at least some of the pre-fabricated sticks are selected from the group of fibrous members, wooden material, and hollow members.

12. The method according to claim 11, wherein the fibrous members include pultruded or extruded members comprising carbon fibres or glass fibres, the pultruded members being fully cured or partially cured, and the wooden material includes balsa, birch, or plywood.

13. The method according to claim 1 wherein at least one pre-fabricated stick comprising fibrous material extends to near the root end of the wind turbine blade shell member.

14. The method according to claim 13, wherein the at least one pre-fabricated stick comprising fibrous material comprises carbon fibres.

15. The method according to claim 1, wherein at least one pre-fabricated stick comprising fibrous material is positioned adjacent to the fastening member along a substantial longitudinal part of the fastening member.

16. The method according to claim 15, wherein at least two pre-fabricated sticks comprise pultruded fibrous members positioned adjacent to the fastening member and along a substantial longitudinal extent of the fastening member.

17. The method according to claim 16, wherein the pultruded fibrous members are arranged around the fastening member such that the arrangement is substantially symmetrical with regard to one or more physical properties including stiffness, E-modulus, alignment and ultimate strength.

18. The method according to claim 1, further comprising the step of applying at least one of a surface material a lightning conductor, and a layer comprising fibre material to the mould.

19. The method according to claim 1, further comprising the step of temporarily connecting the fastening member to a guiding means for at least one of aligning the fastening member relative to at least one further fastening member and aligning the fastening member relative to the rigid outer mould during at least one step of the method of manufacturing.

20. The method according to claim 19, wherein said further fastening member is temporarily connected to a guiding means.

21. The method according to claim 20, wherein said further fastening member is temporarily connected to the same guiding means as the fastening member.

22. The method according to claim 19 further comprising at least one of the steps of releasing the temporary connection between the fastening member and the guiding means and removing the guiding means from the wind turbine blade shell member.

23. The method according to claim 19, wherein the temporary connection of the fastening member to the guiding means involves engaging a threaded hole or a threaded rod of the fastening member with a bolt or a nut via a hole in the guiding means.

24. The method according to claim 19, wherein the temporary connection of the fastening member to the guiding means is gas tight.

25. The method according to claim 1, wherein the guiding means is generally gas impermeable and is arranged to provide a gas tight connection between the guiding means and at least one of the moulds.

26. The method according to claim 1, further comprising the step of arranging a lightning conductor in potential equalizing communication with the fastening member.

27. The method according to claim 26, wherein the lightning conductor is in potential equalising communication with the fastening member adjacent to the root end of the wind turbine blade shell member.

28. The method according to claim 26, wherein the potential equalising communication involves providing a lightning transfer means for decreasing the contact resistance between the fastening member and the lightning conductor.

29. The method according to claim 26, wherein the potential equalising communication involves at least one of a carbon fleece, a carbon fibre web and a carbon fibre mat.

30. A method for manufacturing a wind turbine blade comprising securing a wind turbine blade shell member manufacturable by the method according to claim 1 to at least one further turbine blade shell member to form a wind turbine blade, said securing comprising chemical means or mechanical means.

31. The method according to claim 30, further comprising securing a spar or spacer element to a wind turbine blade shell member as part of forming a wind turbine blade.

32. A method for manufacturing a wind turbine blade comprising securing a multiplicity of wind turbine blade shell members manufactured by the method according to claim 1 such that fastening members from at least two wind turbine blade shell members are aligned.

33. The method according to claim 32, wherein the fastening members are aligned by aligning guiding means corresponding to each wind turbine blade shell members.

34. A wind turbine blade comprising
   a wind turbine blade shell member with pre-fabricated sticks connected by a cured resin, and
   a plurality of fastening members embedded near a root end of the wind turbine blade, at least two of said fastening members being aligned to facilitate connection to a wind turbine hub,
   wherein the pre-fabricated sticks adjacent to the fastening member conform to the shape of the fastening member such that a substantial part the fastening member is tightly enclosed by the pre-fabricated sticks.

35. The wind turbine blade according to claim 34, wherein the general overall shape of the fastening member is generally conical with a larger part oriented away from the root end of the wind turbine blade into the wind turbine blade shell member.

36. The wind turbine blade according to claim 34, wherein the overall shape of the fastening member is concave.

37. The wind turbine blade according to claim 34, wherein the overall shape of the fastening member is generally dumbbell-shaped.

38. The wind turbine blade according to claim 34, wherein the fastening member comprises a section with a non-circular cross section orthogonal to the longitudinal direction of the fastening member.

39. The wind turbine blade according to claim 34, wherein the fastening member has a microscopic surface roughness comprising irregularities in the micrometer to millimeter range.

40. The wind turbine blade according to claim 39, wherein the microscopic surface roughness comprises irregularities in the range of 10 μm to 1 mm.

41. The wind turbine blade according to claim 34, wherein the fastening member has a macroscopic surface roughness, comprising a plurality of recesses and protrusions in the millimeter to centimeter range.

42. The wind turbine blade according to claim 41, wherein the macroscopic surface roughness comprises a plurality of recesses and protrusions in the range of 1 mm to 5 cm.

43. The wind turbine blade according to claim 34, further comprising a lightning conductor in potential equalising communication with the fastening member.

44. The wind turbine blade according to claim 43, wherein the lightning conductor is in potential equalising communication with the fastening member adjacent to the root end of the wind turbine blade shell member.

45. The wind turbine blade according to claim 43, wherein the potential equalising communication comprises a lightning transfer means for decreasing the contact resistance between the fastening member and the lightning conductor.

46. The wind turbine blade according to claim 43, wherein the potential equalising communication involves at least one of a carbon fleece, a carbon fibre web and a carbon fibre mat.

47. The wind turbine blade according to claim 34, wherein the fastening member comprises a threaded surface for connecting to a guiding means during manufacturing of the wind turbine blade shell member, said threaded surface part is suitable for use in the connection of a wind turbine blade comprising the wind turbine shell member to the wind turbine hub.

48. The wind turbine blade according to claim 34, further comprising at least one of a surface material, a lightning conductor, and a layer comprising fibre material.

49. The wind turbine blade according to claim 34 wherein at least one pre-fabricated stick comprising fibrous material extends to near the root end of the wind turbine blade shell member.

50. The wind turbine blade according to claim 49, wherein the at least one pre-fabricated stick comprising fibrous material comprises carbon fibres.

51. The wind turbine blade according to claim 34, wherein at least one pre-fabricated stick comprising fibrous material is positioned adjacent to the fastening member along a substantial longitudinal part of the fastening member.

52. The wind turbine blade according to claim 51, wherein at least two pultruded fibrous members are positioned adjacent to the fastening member and along a substantial longitudinal part of the fastening member.

53. The wind turbine blade according to claim 52, wherein the at least two pultruded fibrous members comprise carbon fibres.

54. The wind turbine blade according to claim 52, wherein the pultruded fibrous members are arranged around the fastening member such that the arrangement is substantially symmetrical with regard to one or more physical properties including stiffness, E-modulus, alignment, and ultimate strength.

55. The wind turbine blade according to claim 51, wherein the at least one pre-fabricated stick comprising fibrous material comprises carbon fibres.

56. The wind turbine blade according to claim 51, wherein the at least one pre-fabricated stick comprising fibrous material is pultruded.

57. A guiding means for at least one of aligning a fastening member relative to at least one further fastening member and aligning the fastening member relative to the rigid mould, during resin transfer moulding of a wind turbine blade shell member, comprising
   a generally gas tight plate-like member;
   a means for obtaining an at least temporary connection between the gas tight plate-like member and at least one fastening member; and
   a means for obtaining an at least temporary connection between the generally gas tight plate-like member and a rigid outer mould;

wherein at least one of said at least temporary connections are gas tight, such that the guiding means are suitable for vacuum-assisted resin transfer moulding.

58. A subassembly for a wind turbine blade shell member comprising a plurality of fastening members connected to a guiding means according to claim 57, wherein the fastening members are aligned.

59. A subassembly according to claim 58 further comprising fibres woven about at least two of the fastening members.

60. The guiding means of claim 57, wherein both at least temporary connections are gas tight.

61. The subassembly of claim 58, wherein the fastening members are aligned substantially in parallel.

* * * * *